United States Patent [19]

Haertling

[11] Patent Number: 4,636,786

[45] Date of Patent: Jan. 13, 1987

[54] ELECTROOPTIC CERAMIC DISPLAY AND METHOD FOR MAKING SAME

[75] Inventor: Gene H. Haertling, Albuquerque, N. Mex.

[73] Assignee: Motorola, Inc., Schaumburg, Ill.

[21] Appl. No.: 450,889

[22] Filed: Dec. 20, 1982

[51] Int. Cl.[4] ............................................. G09G 3/16
[52] U.S. Cl. ................... 340/783; 340/763; 350/392; 350/393
[58] Field of Search ............... 350/392, 393; 340/783, 340/784, 785, 756, 763

[56] References Cited

U.S. PATENT DOCUMENTS

| | | |
|---|---|---|
| 3,499,704 | 3/1970 | Land et al. . |
| 3,512,864 | 5/1970 | Haertling et al. . |
| 3,531,182 | 9/1970 | Land et al. . |
| 3,609,002 | 9/1971 | Fraser . |
| 3,656,834 | 4/1972 | Haller et al. . |
| 3,684,351 | 8/1972 | Kumada . |
| 3,737,211 | 6/1973 | Cutchen et al. . |
| 3,744,875 | 7/1973 | Haertling et al. ............... 350/392 |
| 3,797,913 | 3/1974 | Mori et al. . |
| 3,799,647 | 3/1974 | Luft . |
| 3,806,227 | 4/1974 | Greubel et al. . |
| 3,823,998 | 7/1974 | Yazaki et al. . |
| 3,857,627 | 12/1974 | Harsch . |
| 3,881,806 | 5/1975 | Suzuki . |
| 3,901,584 | 8/1975 | Yamazaki ............... 350/392 |
| 3,912,369 | 10/1975 | Kashnow . |
| 3,938,878 | 2/1976 | Fox . |
| 3,955,190 | 5/1976 | Teraishi . |
| 3,960,438 | 6/1976 | Bonne et al. ............... 350/160 |
| 3,967,253 | 7/1976 | Tsuruishi ............... 340/784 |
| 4,093,356 | 6/1978 | Bigelow ............... 350/338 |
| 4,184,153 | 1/1980 | Glaubitz ............... 340/784 |
| 4,222,638 | 9/1980 | Robert ............... 350/393 |
| 4,232,948 | 11/1980 | Shanks ............... 350/347 R |
| 4,247,166 | 1/1981 | Yeh ............... 350/374 |
| 4,289,384 | 9/1981 | Samek ............... 350/392 |
| 4,472,708 | 9/1984 | Anderson ............... 340/783 |

OTHER PUBLICATIONS

Cutchen et al., Electrooptic Devices Utilizing Quadratic PLZT Ceramic Elements, 1973, Wescon Technical Papers, vol. 17, Sep. 11-14, 1973.
Display Applications of PLZT Ceramics by Maldonado, Fraser and Meitzler, of Bell Labs, Abstract and pp. 67-70.
PLZT Electrooptic Ceramics and Devices by Gene H. Haertling, pp. 265-283.

*Primary Examiner*—Gerald L. Brigance
*Assistant Examiner*—Jeffery A. Brier
*Attorney, Agent, or Firm*—Charles L. Warren; Donald B. Southard

[57] ABSTRACT

An improved electrooptic ceramic reflective display is depicted utilizing polished plates of PLZT ceramic materials in a specific arrangement of dual polarizers, PLZT plate, dual transparent electrode patterns deposited on each major surface in precise alignment of the PLZT plate, and a reflecting surface. The display achieves an optimum effect of high contrast of the associated characters, good brightness, wide viewing angle, and minimum operating voltage requirements. When no voltage is applied, the display has a uniform brightness with no characters shown. When a segment, character, or group of characters is activated by applying a selective voltage, a transverse electrooptic effect is electrically induced and a dark character on a light background is depicted. An elastomer Zebra type connector bar is slit and is utilized to facilitate the electrical connections to the top and bottom electrode pads of the PLZT plate as well as to the associated circuitry for the assembled display.

7 Claims, 13 Drawing Figures

REFLECTIVE DISPLAY

TRANSFLECTIVE DISPLAY

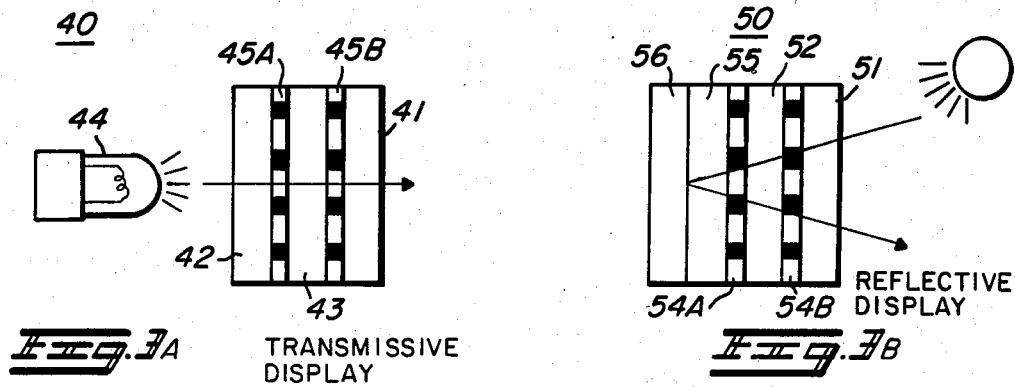
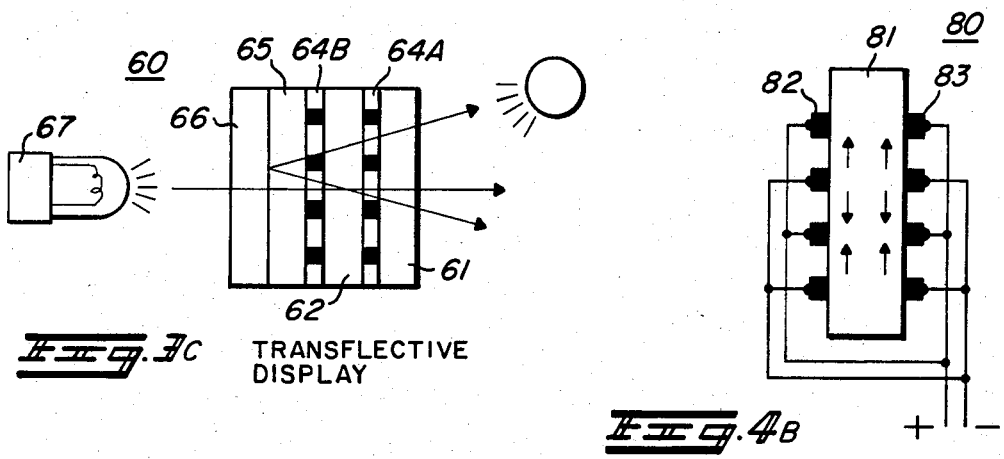
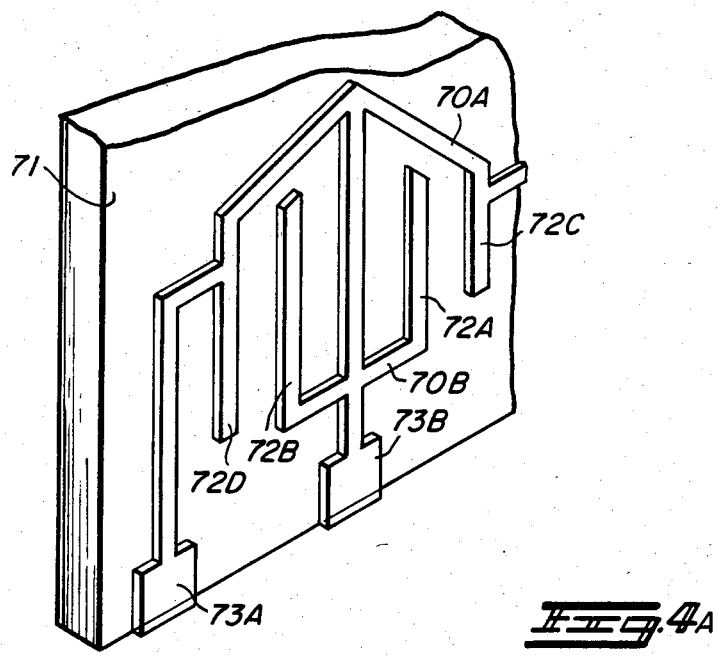

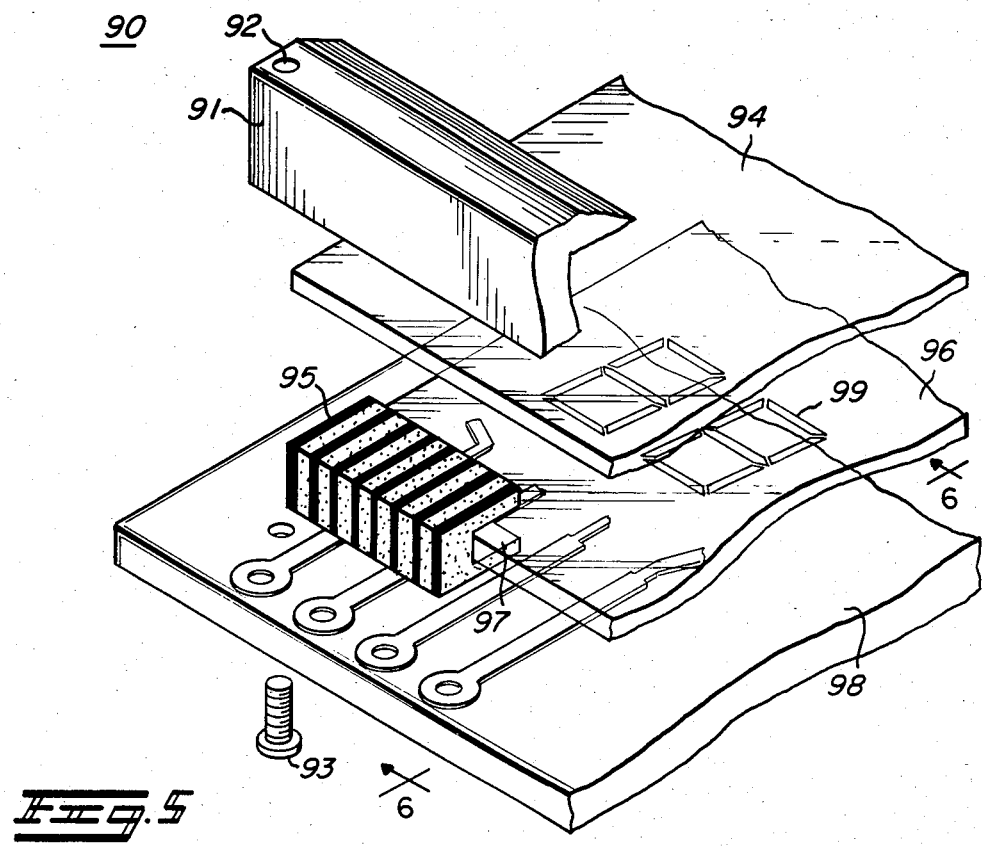
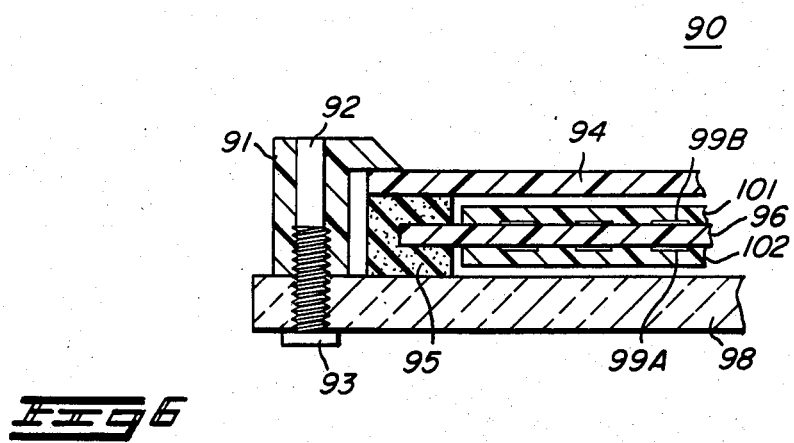

ELECTROOPTIC CERAMIC DISPLAY AND METHOD FOR MAKING SAME

BACKGROUND OF THE INVENTION

The present invention relates in general to electrooptic, alpha-numeric displays and, more particularly, to a reflective display which utilizes ferroelectric ceramic materials, such as polished plates of PLZT arranged along with polarizers, transparent electrodes, and an appropriate reflecting surface in order to achieve an optimum combined effect of high contrast, increased brightness, wide viewing angle, and reduced operating voltage requirements for the display. The result is a display which has an improved appearance and viewing angle and which operates at lower voltage requirements.

Ferroelectric ceramic materials such as PLZT, a well-known ceramic material which has inherently high optical transparency and electrically-controllable light modulation properties, have been found to be useful in optical shutter and display devices In these ferroelectric ceramic materials, light modulation may be produced by essentially two means: (1) light scattering, which has not proven to be a desirable display means because the achievable contrast ratios are too low for acceptable character recognition in high ambient light environments, and (2) optical birefringence, also known as the electrooptic effect, which is a material phenomenon which is capable of producing very high contrast ratios on the order of 5,000 to 1 and is very effective in producing easily viewable displays under all types of lighting conditions In the prior art, the utilization of ferroelectric ceramic materials in various displays has occurred and has resulted in the generation of light modulation by both the light scattering effect approach and the optical birefringence method. In evaluating the technical embodiments of these approaches, it is helpful to distinguish between the essential elements of each approach. For instance, whether the material utilized is of single crystal structure or of ceramic materials. This is important because single crystal materials are distinguishable and different from the ceramic materials in that ceramic materials are composed of random aggregates of microscopic crystallites, on the order of 1 to 15 micrometers in average diameter, intimately bonded or sintered together to form a dense solid material. Likewise, the composition in grain size of the ferroelectric ceramic material utilized in displays found in the prior art will vary relative to the chemical ingredients and additives of the composition resulting in the properties of the ceramics, in some instances, approximating those of a single crystal of similar composition. While in many other instances, new and different properties of the ferroelectric ceramic materials will be created by virtue of the inherent grain structure of the crystallites and the inherent grain boundaries which result.

Any subtle differences in the selection of ceramic material or element placement in the display apparatus will result in the electrooptic behavior of the display device having large variations in the observed effect relative to known devices. For example, light scattering effects are minimal to non-existent in small grain-size materials (less than 2 microns) whether the material used is of the memory type or the non-memory type. Whereas, birefringence is observable and useful in both large grain size non-memory materials (greater than 2 microns), or small grain size non-memory materials; but birefringence is useful only in small grain size ceramic materials which are of the memory type. Additionally, optical transparency is enhanced when large grain size material is utilized and, therefore, it is most critical to a successful display apparatus, to utilize large grain size ceramic material in a non-memory display device, as for example, in a display device which requires maximum brightness and contrast.

It is well understood that the placement of the associated conductive electrodes on the ceraric material is critical to producing the desired display effect. The electrical field vector, which is determined by the placement of the electrodes, does define the internal polarization direction of the ceramic material, i.e., the atomic unit cell elongation, which affects the preferential light scattering direction or the unique optical birefringence retardation direction in the ceramic material utilized. The PLZT ceramics are optically birefringent, uniaxial materials, which are transparent in the wavelength region from 0.37 to 6.5 micrometers (neglecting reflection losses of approximately 32 percent for the combined two major surfaces of the PLZT plates utilized in the subject matter of the present display). The PLZT plates are defined as uniaxial because they possess one unique direction, i.e., the polarization direction, along which light travels at a different velocity relative to the other two orthogonal directions. It is important to recognize that PLZT ceramics possess optically uniaxial properties on a microscopic scale and also on a macroscopic scale when polarized with an electrical field. In uniaxial crystals, there is one unique symmetry axis, the optic axis, which is colinear with the ferroelectric polarization vector in the PLZT ceramics and which possesses different optical properties than the other two orthogonal axes. That is, light traveling in a direction along the optic axis, and vibrating in a direction perpendicular to the optic axis, encounters a different index of refraction than the light traveling in a direction at right angles to the optic axis and vibrating parallel to the optic axis. The difference in velocities, or indexes of refraction, is known as the birefringence or $\Delta n$, (where $n=c/v$ where $c=$velocity of light in a vacuum, and $v$ is the velocity of light along a given crystalline direction). Stated another way, the absolute difference between the two indices is defined as the birefringence, i.e., $n_E - n_O = \Delta n$. The larger the $\Delta n$ of a material, the greater is the inherent optical activity and ability to produce the desired optical retardation or phase delay. On a macroscopic scale, $\Delta n$ is equal to zero before electrical poling and has some finite value after electrical poling, depending on the composition of the ceramic material utilized and the degree of polarization. The $\Delta n$ value is a meaningful quantity in that it is related to the optical phase retardation in the ceramic material. For certain compositions within the PLZT materials, i.e., ferroelectric non-memory type ceramic material such as 9/65/35 (9% La, 65% $PbZrO_3$ and 35% $PbTiO_3$), $\Delta n$ is electrically induced and is proportional to the square of the electrical field strength. This results in a quadratic ceramic material, since $\Delta n = kE$ squared. The subject matter of the present patent application utilizes such ceramic materials.

These ferroelectric ceramic materials, by virtue of their natural cubic symmetry, do not possess permanent polarization and are not optically birefringent in their quiescent state. Such PLZT ceramic materials contribute no optical retardization to an incoming light beam. However, when an electrical field is applied to the PLZT ceramic materials, electrical polarization and birefringence is induced in the ceramic materials, and optical retardation is observed between cross-polarizers. Linearly polarized light, on entering the electrically energized ceramic material, is resolved into two perpendicular components, whose vibration directions are defined by the crystallographic axes of the crystallites acting as one optical entity. Because of the different refractive indices, $n_E$ and $n_O$ (i.e., the respective index along the propagation direction and the respective index perpendicular to the propagation direction), the propagation velocity of the two components will be different within the ceramic material and will result in a phase shift called retardation. The total retardation $\Gamma$ is a function of both $\Delta n$ and the optical path length t (i.e., the thickness of the ceramic PLZT plate), according to the relation $\Gamma = \Delta n \times t$. When sufficient voltage is applied to the PLZT ceramic material, a half-wave retardation is achieved for one component relative to the other. The net result is one of rotating the vibration direction of the linearly polarized light by 90 degrees, thus allowing it to be transmitted by the second (or crossed) polarizer in the "ON" condition. Switching from the state of zero retardation to half-wave retardation will create a light shutter or an electrooptic display.

SUMMARY OF THE INVENTION

It is an object of this invention to provide an electrooptic ceramic display which has improved combined properties of the display operating characteristics.

Another object of the present invention is to provide a display which has brighter characters, greater contrast, a wider viewing angle and a lower operating voltage.

Yet another object of the present invention is to provide an improved electrooptic ceramic display which has transparent electrodes deposited on each of two sides of the PLZT ceramic plate in a precise alignment with each other.

It is still another object of this invention to provide an improved electrooptic ceramic display which utilizes large grain-size material.

Yet another object of the present invention is to provide a transflective display utilizing electrooptic ceramic material which has birefringent features, as well as a transverse mode of operation.

It is yet another object of the present invention to provide an electrooptic ferroelectric ceramic display which is of low cost and can be readily and easily manufactured.

In one aspect of the invention, the electrooptic ceramic display of the present invention comprises a ferro electric ceramic plate having major first and second surfaces on which a plurality of transparent electrodes are deposited in a predetermined pattern on the respective major surfaces thereof in precise alignment with each other through the plate. First and second polarizers are disposed respectively adjacent to the first and second major surfaces of the ceramic plate. Means are included for applying an electric field selectively to the surfaces of the ceramic plate by the excitation of these electrodes.

In the preferred form, the ceramic plate consists of PLZT ceramic material. A conductive elastomer bar is used to effect the electrical connections to the electrodes and a bonding agent is used to affix the respective polarizers to the ceramic plate in the assembled condition.

For effecting a reflective type display, a reflector is included positioned adjacent to second polarizer. For transreflective type displays, a light source may be used behind the reflector. For these displays, the polarizers may be oriented in parallel with each other or, alternatively, perpendicular to one another.

BRIEF DESCRIPTION OF THE DRAWINGS

The features of the present invention which are believed to be novel are set forth with particularity in the claims. The invention itself, however, together with the further objects and advantages thereof, may be best understood by reference to the following description when taken in conjunction with the accompanying drawings, in which like reference numerals refer to like elements in the several figures, and in which:

FIGS. 3A, 3B and 3C are representational cross-sectional views of the assembled devices of FIGS. 2A, 2B and 2C for transmissive, reflective and transflective types of displays, respectively.

FIG. 4A represents an enlarged partial, perspective view of the transparent, interdigital electrodes found on each major surface of the PLZT plate of the present invention.

FIG. 4B illustrates the parallel electrical connection scheme for the electrodes of a display device in accordance with the present invention and which are utilized in the transverse mode of operation.

FIG. 5 is a partial exploded view of a representative display in accordance with the present invention illustrating the electrical connection of the transparent electrodes to the associated printed circuit board.

FIG. 6 is an enlarged partial cross-sectional view along line 6—6 of FIG. 5 illustrating the present invention after a display has been assembled and mounted to the associated electronic equipment hardware.

DETAILED DESCRIPTION OF THE PREFERRED EMBODIMENT

Figure 1A:
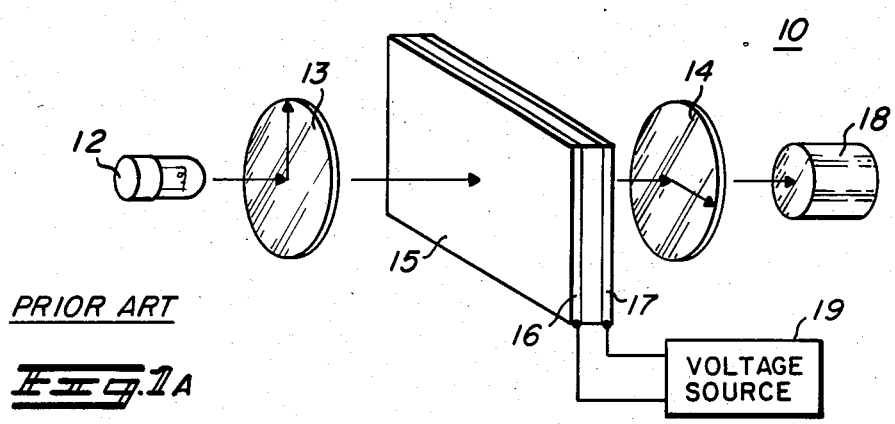
FIGS. 1A, 1B and 1C illustrate various unassembled views of ceramic displays, which are found in the prior art.

Referring now to the drawings, FIG. 1A illustrates one type of PLZT display, referred to as a transmissive type display 10, in an exploded view, which is known in the art. The transmissive display 10 utilizes a back light 12, dual cross-polarizers 13 and 14 and a suitably-electroded plate of non-memory (slim loop) electrically induced PLZT material 15 placed between the two polarizers 13 and 14. Transparent electrodes 16 and 17 may be complete or segmented and are situated on each of the two major surfaces of the PLZT plate 15. The display has a source of voltage 19, and when voltage is applied, an electric field is directed through the thickness of the plate in a direction colinear with the viewing direction. This operational mode is defined as the longitudinal mode. When no voltage is applied, linearly-polarized light is unaltered as it travels through the PLZT plate 15 and is blocked by the second cross-polarizer 14. However, when voltage is applied to the display, the polarized light on entering the PLZT plate 15 is altered, or depolarized, which results in a portion of the incident light being allowed to pass through the second polarizer 14 and be viewed by means 18. This prior art device utilizes a similar configuration of our present invention with one important exception, i.e., a longitudinal mode of operation does not exist with our present invention. Rather, our present invention has a transverse mode of operation which produces a reflective display device with increased properties of brightness, greater contrast and improved resolution of character segments. The transmissive display 10 is of marginal value as a reflective display because of an inherent lower contrast.

Figure 1B:
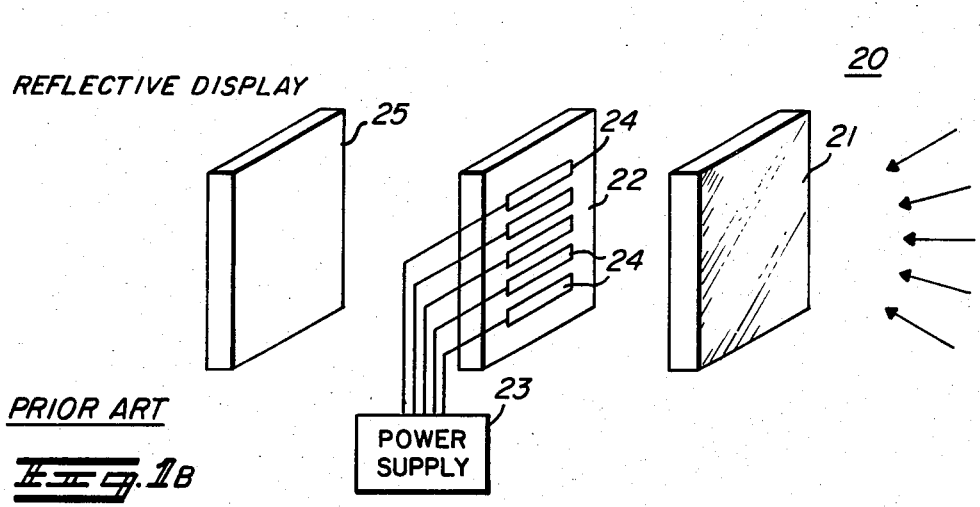

FIG. 1B shows an exploded view of one type of conventional reflective display 20 also known in the prior art. This type of reflective display 20 utilizes various materials, including PLZT ferroelectric ceramics, liquid crystal, or suspended dielectric needles. In operation, ambient light passes through the circular polarizer 21, which is a combination of a linear polarizer and a quarter-wave retardation plate (not shown). The ambient light is circularly polarized and proceeds to the PLZT plate 22. The PLZT plate 22 has electrodes 24 on a single surface thereof. The reflective display 20 has an associated power supply 23. If no voltage is applied to the PLZT plate 22, the circularly-polarized light proceeds undisturbed through the transparent PLZT plate 22 and is reflected by the non-depolarizing, diffuse reflector 25. Upon reflection, the rotation of the circularly-polarized light is reversed (e.g. right to left handedness) and after again proceeding undisturbed through the PLZT plate 22, the light is blocked by the first circular polarizer 21. This produces a dark or closed condition. If voltage is applied to the PLZT plate 22, the circularly-polarized light is further retarded by the PLZT material, which then produces a linearly-polarized light which is reflected by the non-depolarizing diffuse reflector 25. The linearly-polarized light on the return reflection strikes the activated PLZT plate 22, and is further retarded, producing circularly-polarized light of the proper rotation or handedness, such that it passes through the initial circular polarizer 21. This condition results in a light or open state. In a reflective display 20, the activated regions are light segments on a dark background. Typically, the ferroelectric ceramic material utilized in the PLZT plate for a reflective display, is comprised of fine grain memory PLZT material. This type of display is only capable of producing a light character on a dark background. Therefore, such reflective displays are not usually very bright in the illumination of their characters. The subject matter of our present invention can produce both light characters on a dark background, or dark characters on a light background, because of the dual linear polarizers which are utilized may be aligned or crossed selectively. Additionally, the subject matter of the present invention includes double-sided operation of the transparent electrodes along with the interdigital electrode patterns, resulting in lower voltage requirements for operation of the display.

Figure 1C:
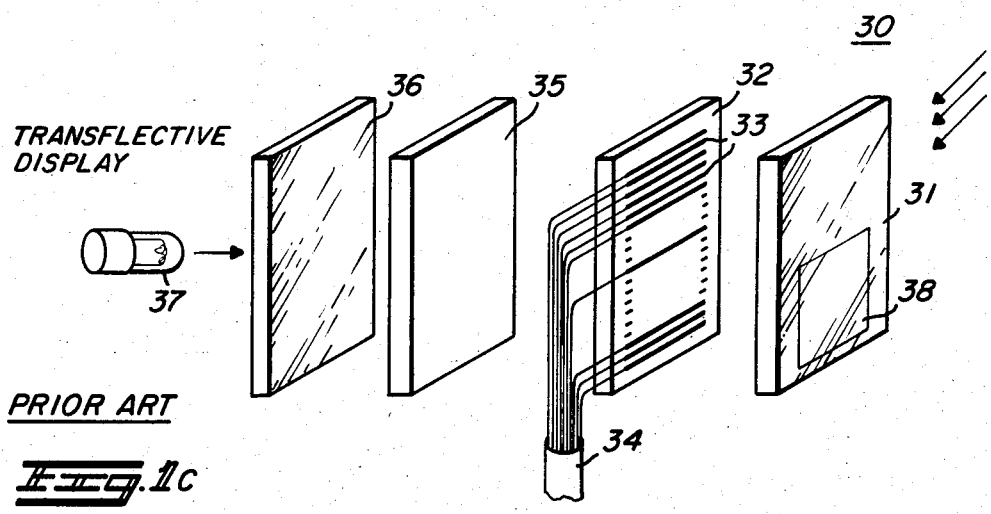

FIG. 1C illustrates an exploded view of a transflective display 30 further found in the prior art. Ambient room light (reflective) and artificial backlight (transmissive) are used together in conjunction to produce a constantly viewable display in either dark or highly-lighted environments. Ambient room light passes through an initial circular polarizer 31 and becomes circularly polarized and proceeds on to the PLZT plate 32. The associated electrode pattern 33 is disposed on a single surface of the PLZT plate 32. The transflective display has a power supply means 34, and if no voltage is applied to the PLZT plate 32, the circularly-polarized light proceeds undisturbed through the PLZT plate 32 and is reflected by the non-depolarizing partial deflector 35. If voltage is applied to the PLZT plate 32, the circularly-polarized light is further retarded by the PLZT material, which produces linearly-polarized light which is allowed to proceed through the partial reflector 35 to strike the second polarizer 36. Upon reflection of the initial ambient light, as well as transmission of the light emanating from backlight source 37, a predetermined viewing area and angle 38, which is located on the bottom portion of the initial circular polarizer 31, is accessible to the observer. This results in a transflective display which has a reduced viewing angle and reduced contrast of the character brightness.

Figure 2A:
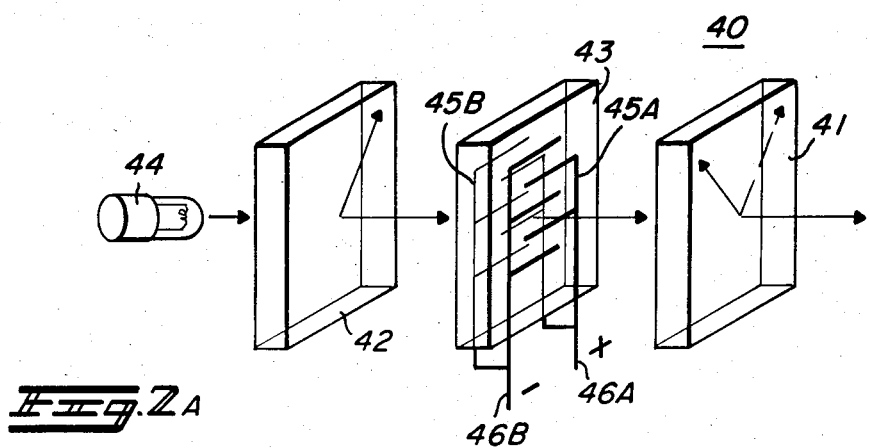
FIGS. 2A, 2B and 2C represent various unassembled views of displays incorporating the present invention and which include transmissive, reflective and transflective types of displays.

In FIG. 2, various embodiments of the present invention are depicted in an exploded view. FIG. 2A pertains to one embodiment of the present invention resulting in a transmissive display 40. Dual linear polarizers 41 and 42 are disposed on either side of the interdigital transparent electroded PLZT plate 43, such that unpolarized light from the back light source 44, first strikes polarizer 42, and is transmitted as linearly-polarized light, which is vibrating in the direction of the arrow, (i.e., at a 45 degree angle to the length direction of the transparent electrodes on the PLZT plate 43), and will provide a condition for maximum birefringent effect for the transverse mode of operation, and, therefore, maximum brightness and contrast for the display 40. The PLZT plate 43 has identical transparent electrode patterns 45a and 45b deposited on each major surface of the PLZT plate 43 in precise alignment with each other. A power supply means (not shown) is illustrated by the positive and negative terminals, 46a and 46b respectively, and which is deemed applied to the transparent electrode patterns 45a and 45b. The linearly-polarized light enters the PLZT plate 43, and when no-voltage is applied to the associated electrodes 45a and 45b, the light proceeds undisturbed through the PLZT plate and exits the plate where it is blocked by the second cross-polarizer 41. This represents the unactivated or "OFF" position. If the transmissive display device 40 is operated with parallel polarizers for items 41 and 42, then this unactivated or "OFF" condition is one where the undisturbed linearly-polarized light proceeds through the aligned, second polarizer 41. In the cross polarizer mode of operation, when voltage is applied to certain selected areas of the PLZT plate 43 by energizing segments of the dual electrode pattern 45a and 45b, the linearly-polarized light striking the activated areas will be effectively rotated by 90 degrees, assuming that half wave voltage has been applied, and upon exiting the PLZT plate 43, the linearly-polarized light is allowed to pass through the second, cross-polarizer 41. If parallel polarizers are utilized for polarizers 41 and 42, the light leaving the activated PLZT plate 43 can now be blocked by polarizer 41. Therefore, cross-polarizers representing 41 and 42 will produce a light character on a dark background, whereas, parallel polarizers representing 41 and 42 will produce dark characters on a light background. In this transmissive mode, the cross-polarizer display arrangement will always yield a higher contrast display than the parallel polarizer display arrangement.

Figure 2B:
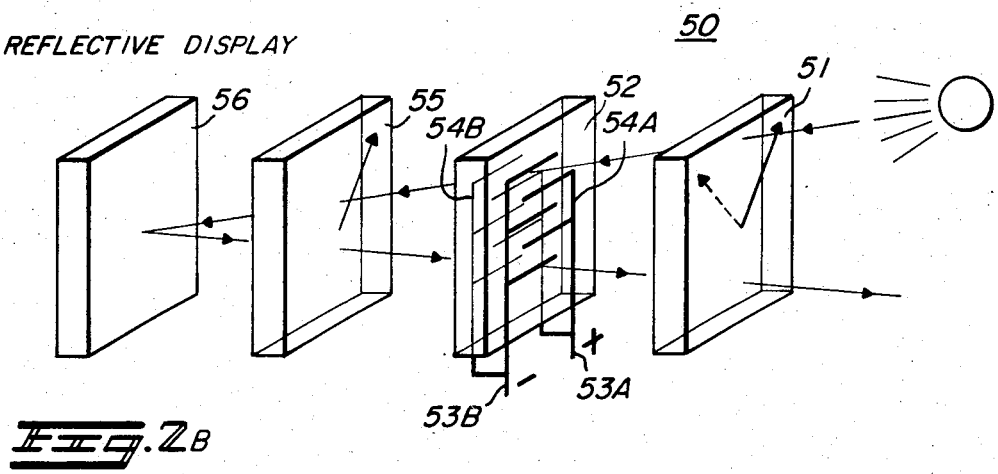

FIG. 2B pertains to another embodiment of the present invention resulting in a reflective display 50. Ambient, unpolarized light strikes the initial linear polarizer 51 and is linearly polarized and passes through to the unactivated PLZT plate 52. The PLZT plate 52 has transparent electrode patterns 54a and 54b deposited on each major surface of the PLZT plate 52 in precise alignment with each other. The reflective display 50 has a power supply means (not shown) illustrated by the positive and negative terminals 53a and 53b connected to the transparent electrode patterns 54a and 54b. When no voltage is applied, the light proceeds undisturbed through the PLZT plate 52 and is allowed to pass through the second parallel polarizer 55. When voltage is applied to the PLZT plate 52, the linearly-polarized light is rotated 90 degrees by the active areas of the PLZT plate 52 and is blocked by the second polarizer 55. Utilizing crossed polarizers as 51 and 55, will produce a light character on a dark background; and when parallel polarizers are utilized as 51 and 55, then a dark character on a light background will be produced.

Similarly, a reflective display may operate in the crossed polarizer mode, as follows. When no voltage is applied, the light proceeds undisturbed through the PLZT plate 52 and is blocked by the second crossed polarizer 55. Any residual light passing through the second polarizer 55 is reflected by the diffuse, non-depolarizing reflecting surface 56 and is reflected back through the medium again, being eventually blocked by the initial linear polarizer 51. When voltage is applied to the PLZT plate 52, the linearly-polarized light is rotated 90 degrees by the active areas of the PLZT plate 52 and passes through the second polarizer 55, eventually striking the reflecting surface 56 where the light is reflected and again will pass through the medium.

Figure 2C:
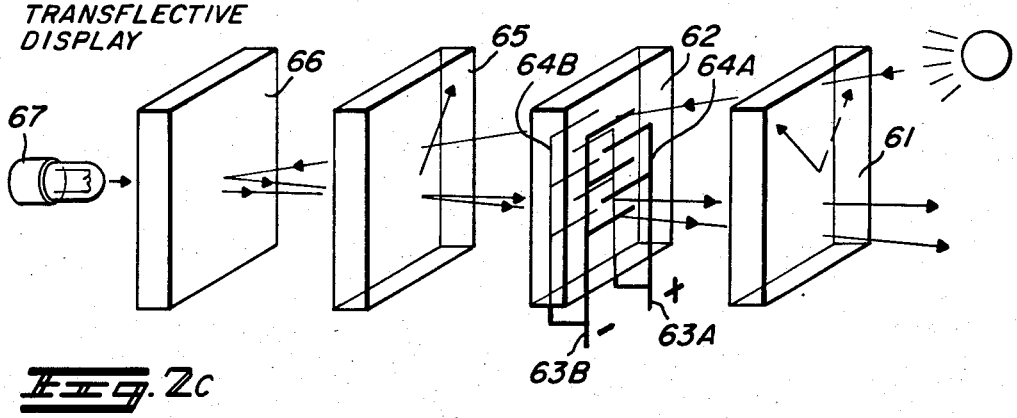

FIG. 2C pertains to still another embodiment of the present invention resulting in a transflective display 60. Ambient front light and back light may occur separately or simultaneously. The back light 67 may be an incandescent lamp, a fluorescent lamp or a flat electroluminescent panel. Ambient, unpolarized light strikes the initial linear polarizer 61 and is linearly polarized and passes through to the PLZT plate 62. The PLZT plate 62 has transparent electrode patterns 64a and 64b deposited on each major surface of the PLZT plate 62 in precise alignment with each other. The transflective display 60 has a power supply means (not shown) illustrated by the positive and negative terminals 63a and 63b respectively, connected to the transparent electrode patterns 64a and 64b. Unpolarized light from the back light source 67, first strikes the diffuse, non-depolarizing partial reflecting surface 66, and is transmitted as unpolarized light (in the direction of the arrow) until it strikes polarizer 65 where it is further transmitted as polarized light vibrating in the direction of the arrow. When no voltage is applied, the ambient light proceeds undisturbed through the PLZT plate 62 and is blocked by the second crossed polarizer 65. Any residual light passing through the second crossed polarizer 65 is reflected by the diffuse, non-depolarizing reflecting surface 66 and is reflected back through the medium again, eventually being blocked by the initial linear polarizer 61. When voltage is applied to the PLZT plate 62, the linearly-polarized light is rotated 90 degrees by the active areas of the PLZT plate 62 and passes through the second polarizer 65 and eventually strikes the reflecting surface 66, where the light is reflected and again passes through the medium. Utilizing crossed polarizers as 61 and 65, will produce a light character on a dark background; and when parallel polarizers are utilized as 61 and 65, then a dark character on a light background will be produced.

Similarly, a transflective display may operate in the parallel mode, as follows. When no voltage is applied, the light proceeds undisturbed through the PLZT plate 62 and is allowed to pass through the second parallel polarizer 65. When voltage is applied to the PLZT plate 62, the linearly-polarized light is rotated 90 degrees by the active areas of the PLZT plate 62 and is blocked by the second parallel polarizer 65.

Therefore, for a transflective display, it can be determined that polychromatic, unpolarized ambient light first strikes an initial top linear polarizer, which will transmit a portion of this incident light (typically 42% or greater depending on the type of polarizer used) as polarized light vibrating in one preferred direction. This vibration direction should be oriented at an angle of 45 degrees with respect to the length direction of the transparent interdigital electrodes which have been deposited in precise alignment on each major surface of a polished PLZT plate. The polarized light is incident to the electroded PLZT plate. The PLZT ceramic material is optically isotropic when no voltage is applied; this will result in no birefringence or optical activity, and the light will be transmitted through the PLZT plate in an unchanged condition. The light is further transmitted in an unchanged condition (perhaps with the exception of some absorption) by a second polarizer, which is located behind the PLZT plate and which is aligned parallel to the first polarizer. On striking the reflecting surface, the light is reflected back through the display in a similar manner to the incident condition. When no voltage is applied to the display, the display has a uniform brightness with no characters shown; this will also be the appearance of the background of the display when selected characters of the display are selectively activated by selectively applying voltage. Thereafter, when a segment, character, or group of characters is selectively activated or electrically induced by applying voltage, the transparent electrode patterns on each side of the PLZT plate, which are electrically connected in parallel to like polarity electrodes, will result in a transverse electrooptic effect. This transverse electrooptic effect will be near the major surfaces of the PLZT plate, and will result in an electrical field which is perpendicular to the direction of the light propagation. The linearly polarized light, when striking the selecting activated area of the PLZT surface, will be effectively rotated 90 degrees and is thereby blocked by the second polarizer. The minor amount of light which does reach the reflecting surface which is located behind the second polarizer is further blocked by the second polarizer upon the reflection and exit path.

In FIG. 3, various of the described embodiments of the present invention are depicted in enlarged cross sectional views. FIG. 3A pertains to a cross sectional view of the embodiment of the present invention for a transmissive type display 40, previously described in detail for FIG. 2A. FIG. 3B pertains to a cross sectional view of the embodiment of the present invention for a reflective type display 50, previously described in detail for FIG. 2B. FIG. 3C pertains to a cross sectional view of the embodiment of the present invention for a transflective type display 60, previously described in detail for FIG. 2C.

It is important to note that the transparent electrode patterns, 45a and 45b, 54a and 54b and 64a and 64b, are deposited on each major surface of the associated PLZT plate (43, 52 and 62, respectively) and are in precise alignment to each other. The transparent conductive electrodes are made of an indium tin oxide composition or similar material, and are deposited in a registered, interdigital pattern of interpenetrating fingers on each major surface of the PLZT plate. The transparent electrodes are selectively activated in parallel so as to produce the maximum, transverse, electrooptic birefringent effect at a given or initial operating voltage.

The viewing angle of each of the displays is maximized when the polarizers and reflecting surfaces are located as close to the surface of the PLZT plate as is possible. Therefore, it is desirable to minimize the thickness of both the polarizers and the PLZT plate to achieve optimum results.

In FIG. 4A, an enlarged partial perspective view of the transparent interdigital electrodes 70A and 70B, which are deposited on each of the two major surfaces of the PLZT plate 71 (only one side is shown) is illustrated. Each of the transparent interdigital electrodes is comprised of a physical arrangement of interpenetrating fingers, 72A, 72B, 72C and 72D etc.; each of the interpenetrating fingers are spaced equal distance from each other and are all uniform in direction. These interpenetrating fingers are all aligned in a horizontal orientation, although the fingers could be aligned in a vertical orientation as well, or in a part-horizontal and part-vertical orientation, or at some uniform angle, such as 45 degrees, provided such patterns are non-random and uniform. This will facilitate an equal retardation effect during the operation of the display. The transparent interdigital electrodes are made from indium tin oxide composition, typically referred to in the industry as ITO, and which is deposited in a manner so that the electrode on each surface of the PLZT plate 71, is on the order of 1,000–7,000 angstroms thick, depending on the desired resistivity of the electrode. The electrodes are in precise alignment with each other. The conductive electrode pattern on each side of the PLZT plate should be connected so that electric fields having the same polarity are generated on opposing surfaces. A voltage source is connected across pads 73A and 73B.

The interdigital interpenetrating fingers 72A–D portion of the conductive transparent electrodes causes a surface electrical field to be generated between the positive and negative electrodes on each side of the PLZT plate. Since an Electrical Field=(Voltage/Distance), the particular pattern selected for the interdigital interpenetrating electrodes will permit a resulting reduction (or increase) in the voltage requirements for operating a display; the Distance factor is reduced (or increased) proportionately, depending on the spacing of the interdigital interpenetrating fingers of the electrodes. The Distance factor is the distance the positive and negative electrodes are separated. Given a transverse mode, when you interdigitate the interpenetrating fingers of the electrodes on each surface of the PLZT plate, you correspondingly reduce the Distance factor proportionally and the resulting voltage. For a longitudinal device, the electrical field would be increased proportionately to the thickness of the PLZT, and in order to achieve relatively low operating voltages, a thin PLZT plate (on the order of 3.0 mils or so) would be required. Alternatively, for a transverse device, it was discovered that acceptable operating voltage can be achieved with a PLZT plate having a thickness of 15.0 mils or so, with electrode spacing of the interdigital fingers of around 2.5 to 3.0 mils or so.

FIG. 4B illustrates the parallel electrical connection scheme 80 of the present invention utilized in the transverse mode of operation for a transflective display. The transparent interdigital electrodes are deposited on each major surface of the PLZT plate 81. The transparent interdigital electrodes 82 and 83 produce surface birefringence (retardation) in the gaps between the electrodes. Since the surface electrodes are transparent and precisely aligned, the optical effects of the activated regions extend to some degree beneath the transparent interdigital electrode and tend to blend together to produce a more or less solid dark or light character segment. Operating both sides of electrodes in parallel allows the display to use thicker PLZT plates and still have sufficient birefringence (retardation) to produce a bright, high contrast display. All positive and negative electrodes are electrically connected on the same surface individually to achieve individual address to each finger of the electrode. When a segment, character or group of characters is activated by applying a voltage source to the appropriate transparent interdigital electrodes located on each major surface of the PLZT plate, with like electrodes on both surfaces being electrically connected in parallel, a transverse electrooptic effect (i.e., the electric field perpendicular to the light propagation direction) is electrically induced in and near the major surfaces of the PLZT plate. The magnitude of the electrooptic effect is proportional to the square of the applied electric field. The arrows in FIG. 4B indicate the surface electric fields generated by energizing the transparent electrodes.

In FIG. 5, an enlarged exploded perspective view of a solid state reflective display 90 utilizing the present invention is depicted. A retainer member 91 with an aperture 92 disposed to receive a fastening means 93 is assembled with a protective transparent shield 94 which protects and seals the reflective display 90 when assembled. One approach to connect the electrodes on both sides of the PLZT plate 96 is to use a conductive elastomer bar, or Zebra strip 95 which has been split along its length so that the PLZT plate 96 can be placed into the slot 97. The PLZT plate 96 has a thickness of between 8 to 20 mils. When the elastomer is compressed by assembly of the retainer member 91, such will produce a simultaneous electrical connection between the top electrode pattern and the bottom electrode pattern on the PLZT plate 96 within the elastomer connector bar 95. Like segments of the two electrode patterns 99 will be connected in parallel. Additionally, electrical connection is facilitated with an associated printed circuit board 98 by the elastomer conductor bar 95. The conductive elastomer will also provide a seal from the top retaining member 91 to the lower associated printed circuit board 98, as well as provide for protection against vibration, and shock mounting of the PLZT plate within the display.

FIG. 6 illustrates an enlarged partial cross-sectional view along lines 6—6 of FIG. 5 illustrating the assembled display 90 with all electrical connections being facilitated. The transparent electrode patterns 99A and 99B are deposited at each major surface of the PLZT plate 96 so that they are in precise alignment with each other. A top linear polarizer 101 is placed above the PLZT plate 96, its bottom surface having a thin film of adhesive applied thereto. The top linear polarizer 101 is then placed on top of the transparent electrodes 99B located on the top surface of PLZT plate 96. In a similar fashion, a bottom linear polarizer 102 is placed below the PLZT plate 96, its top surface having a thin film of adhesive applied thereto. The bottom linear polarizer 102 is then placed on top of the transparent electrodes 99A located on the bottom surface of PLZT plate 96. The zebra elastomer connector bar 95 is slit, and the PLZT plate 96 is placed therein to facilitate electrical connection of the electrodes 99A and 99B. The elastomer connector bar 95 makes the electrical connections to the printed circuit board 98 and is compressed by the retaining member 91 and the transparent protective plate 94.

Experiments have led to the development of at least two methods of manufacturing the various embodiments of the electrooptic ceramic display. In one method, the Subtractive Method, a plate of ferroelectric ceramic material, like PLZT, is prepared and cleaned for accepting a transparent electrode pattern on each surface of the plate. The interdigital electrode pattern and associated connecting pads are defined on a set of photolithographic masks. After the masks are made, the pattern is defined on each surface of the plate and photoresist is deposited uniformly on each surface in those areas where the pattern does not exist. After the photoresist is cured a composition of conductive indium-tin-oxide is deposited on each surface of the plate so as to produce a distinct step pattern between the photoresist and the exposed plate. An acetone solvent is then applied to the plate to remove the undesired photoresist and the unwanted indium-tin-oxide composition. After the plate is dried, the resulting pattern is inspected and-/or tested for desired electrical functionality. The plate, which now has the electrode pattern on each surface in precise alignment, is then assembled into the final display, utilizing an elastomer connector bar, which is slit, to simultaneously facilitate all the required electrical connections of the display.

In another method, the Additive Method, a plate of ferroelectric ceramic material, like PLZT, is prepared and cleaned for accepting a transparent electrode pattern on each surface of the plate. A uniform layer of a conductive indium-tin-oxide composition is deposited on each surface of the plate by commercial sputtering equipment. The interdigital electrode pattern and associated connecting pads are defined on a set of photolithographic masks. After the plates containing a layer of indium-tin-oxide composition are cleaned, a photoresist sensitive to ultraviolet light, is uniformly deposited on each surface of the plate. The set of photolithographic masks are positioned over each surface of the plate, and after the photoresist has been cured the photoresist is simultaneously exposed to top and bottom sources of ultraviolet light. The resulting photolithographic transfer is developed by washing the exposed photoresist in a weak caustic solution. Since the PLZT material is a good absorber of ultraviolet light, the resulting developed patterns on each surface of the plate will be in precise alignment with each other through the plate. The plate is then rinsed, dried and then placed in an acid solution to etch away the indium-tin-oxide composition on each surface of the plate where the indium-tin-oxide material is not desired, leaving the electrode patterns in precise alignment with each other through the plate. The plate is then cleaned and dried. After the electrode patterns are inspected and/or tested for electrical functionality, the plate is then assembled into the final display utilizing an elastomer connector bar, which is slit, to simultaneously facilitate all the required electrical connections of the display.

Thus, there has been provided according to the present invention an improved and inexpensive electrooptic ceramic display with various embodiments corresponding to different modes of operation. Although the foregoing has been a description and illustration of specific embodiments of the invention, various modifications and changes thereto can be made by persons skilled in the art within the scope and spirit of the invention as defined by the following claims.

What is claimed is:

1. An electrooptic ceramic display comprising:
a first and second polarizer;
a uniaxial transparent ferroelectric ceramic plate having first and second parallel major surfaces, said first and second surfaces disposed contiguous to said first and second polarizers, respectively;
means for inducing first and second electric fields on the first and second surfaces of said plate, respectively, said first and second fields having the same polarity orientation and occupying opposing areas on said first and second surface, said inducing means capable of selectively inducing said first and second fields at a plurality of perdetermined areas on said first and second surfaces; and
a reflector disposed adjacent said first polarizer on a side of the first polarizer opposite said plate.

2. The display according to claim 1 further comprising a light source disposed adjacent said reflector opposite said first polarizer, said reflector being a partial reflector which passes a portion of light emitted by said light source and reflects a portion of the external light entering the display, thereby defining a transflective display.

3. The display according to claim 1 wherein said plate consists of PLZT.

4. The display according to claim 1 wherein said inducing means includes a plurality of electrode groups disposed to induce electric fields to form selectable alphanumeric characters.

5. An electrooptic display comprising:
means for controlling the display of selectable indicia in response to an applied electric field, said controlling means including a first and second polarizer, an electrooptic plate disposed between said first and second polarizers and having first and second major surfaces, first and second sets of electrodes disposed on said first and second surfaces, respectively, said first set of electrodes being in mutual registration with said second set of electrodes, first and second groups of conductors disposed on said first and second surfaces, respectively, and connected to said corresponding first and second sets of electrodes, said first and second groups of conductors disposed opposite each other at an edge of said plate;
an elongate elastomer bar having a plurality of spaced-apart transverse conductive sections and an elongate slit in which said edge of the plate is seated, each conductive section engaging one of the first conductors and an oppositely disposed one of said second group of conductors thereby connecting said first and second groups;
a printed circuit board having a plurality of spaced-apart conductive runners, said bar engaging said printed circuit board, said runners spaced-apart so as to contact correspondingly spaced ones of said conductive sections, whereby each runner is electrically connected to one electrode in said first set and to an electrode in said second set in mutual registration with said one electrode.

6. The display according to claim 5 further comprising a mechanical means for securing said bar to said printed circuit board.

7. The display according to claim 5 further comprising a retaining plate, said retaining plate contiguously engaging a surface of said bar and said printed circuit board contiguously engaging an opposing surface of said bar so that said bar seals said electrooptic plate between said retaining plate and said printed circuit board.

* * * * *